United States Patent Office 3,526,668
Patented Sept. 1, 1970

3,526,668
ALLYL PHENOLS
William H. Starnes, Jr., and Tad L. Patton, Baytown, Tex., assignors to Esso Research and Engineering Company
No Drawing. Filed Oct. 2, 1967, Ser. No. 671,975
Int. Cl. C07c 39/18
U.S. Cl. 260—624          13 Claims

ABSTRACT OF THE DISCLOSURE

An allylated phenol substantially free of allylaryl ether is obtained by contacting an alkali metal salt of a 2,6-disubstituted phenol with a primary allyl halide in a solvent.

BACKGROUND OF THE INVENTION

Field of the invention

The present invention is directed to allylation of phenols. More particularly, the invention is concerned with allylation of phenols to obtain an allyl phenol substantially free of allylaryl ether. In its more specific aspects, the invention is concerned with a method of preparing allylated phenol employing a solvent to produce allylated phenols and recovering the allylated phenol.

Description of the prior art

Heretofer, nuclear allylation of phenols has been accompaned by attack by the allylating agent upon the phenolic hydroxyl group with resultant formation of considerable amounts of the corresponding allylaryl ethers. Allyl phenols have been produced by the Claisen rearrangement, but prior to the present invention 2,6-disubstituted allyl phenols in which the allyl moiety is attached to the ring by an unsubstituted allylic methylene group were not readily obtainable.

SUMMARY OF THE INVENTION

The present invention may be briefly described and summarized as involving a method of producing allyl phenols in which an alkali metal salt of a 2,6-disubstituted phenol, preferably a 2,6-di-t-alkylphenol, is contacted in a solvent, preferably a highly polar aprotic solvent, with a primary allyl halide to form a product containing allylated phenol substantially free of allylaryl ether.

DESCRIPTION OF THE PREFERRED MODES

The present invention may be illustrated by the reaction according to the following equation:

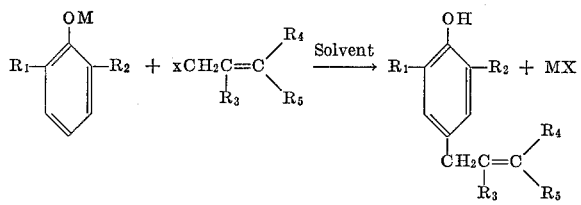

where M is an alkali metal; X is chlorine, bromine, or iodine; $R_1$ and $R_2$ are alkyl groups, preferably t-alkyl, which may be either the same or different; and $R_3$, $R_4$, and $R_5$ may be either the same or different and may be selected from the following: hydrogen, halogen, alkyl, alicyclic, or aryl.

The phenols employed in the present invention are 2,6-disubstituted phenols, preferably 2,6-di-t-alkylphenols. Exemplary of the substituted phenols are: 2,6-di-t-butylphenol, 2,6-di-t-pentylphenol, 2,6-di-t-octylphenol, and 2,6-dicyclohexylphenol.

The allyl halides used in the present invention include the allyl iodides, chlorides, and bromides. Allyl chlorides and bromides are preferred. Examples of suitable allyl halides include: allyl bromide, allyl iodide, allyl chloride, 1-bromo-3-methyl-but-2-ene, and 1-chloro-5,5,7,7-tetramethyl-oct-2-ene.

The organic solvent employed in the present invention may suitably be a mono-cyclic aromatic hydrocarbon such as but not limited to benzene, ethylbenzene, toluene, xylene, and the higher members of the homologus series but, preferably, a highly polar aprotic solvent such as but not limited to dimethylformamide, dimethylacetamide, N-methylpyrrolidone, hexamethylphosphoramide, and similar organic nitrogen-containing solvents.

The allyl phenols of the present invention have 3 to 12 carbon atoms in the allyl group and are useful as oxidation inhibitors. Particularly, the allyl phenols are useful in inhibiting oxidative attack on solid polymers of alpha mono-olefins such as polyethylene and polypropylene; solid copolymers of alpha monoolefins may also be stabilized against oxidative attack. The allyl phenols may be used to inhibit oxidation of gasoline, jet fuel, natural and synthetic rubber, vegetable fats and oils, and the like.

Temperatures employed in producing the allyl phenols may range from ambient temperatures to reflux temperatures to reflux temperatures of the reaction mixture which may range from about 25° to about 300° C.

The alkali metal salt of the dialkylphenol and the allyl halide are suitably used in a molar ratio from about 1:1 to about 1:20, preferably 1:1.1, and the molar ratio of solvent to alkali metal salt may vary from about 1:1 to about 20:1, preferably 5:1, when the solvent is dimethylformamide.

The allyl phenol may be suitably recovered from the reaction product by solvent fractionation, solvent precipitation, drying, washing with solvents and the like, fractional distillation, gas chromatographic separation, or by a combination of two or more or all these techniques or by other well known separation methods.

In the several examples, the abbreviation NMR signifies nuclear magnetic resonance and G.C. signifies gas chromatographic.

EXAMPLE 1

A solution of 2,6-di-t-butylphenol (41.4 g., 0.201 mole) in 200 ml. anhydrous methyl alcohol was placed in a 3-necked flask protected from moisture and fitted with a dropping funnel, nitrogen gas inlet, stirrer, and a condenser attached for distillation. The air in the flask was replaced with nitrogen, and a solution of sodium methoxide (10.8 g., 0.200 mole) in 50 ml. anhydrous methanol was added. The methanol was removed by distillation. Then 400 ml. dry benzene was added to the residue and distillation continued to remove methanol. This was repeated again to remove the last traces of methanol. Then 400 ml. benzene was added to the dry salt and the distillation attachment replaced by a reflux condenser.

To the stirred suspension was added allyl bromide (48.3 g., 0.399 mole), and the mixture was stirred and heated at reflux temperature overnight. The mixture was then cooled and washed with water to remove all the salt formed during the reaction. After drying over anhydrous magnesium sulfate, the benzene was removed and the residue distilled. Twenty-one grams of unreacted 2,6-di-t-butylphenol were collected at 78–84° C./0.2 mm. The desired product was in the fraction collected at 88–90° C./0.2 mm. This fraction weighed 17.3 g.; G.C. analysis showed it contained 34.8% of the desired product. Therefore, the yield of desired product was 12%, based on starting phenol, or 25%, based on phenol consumed in the reaction. A nuclear magnetic resonance spectrum confirmed the structure (4-allyl-2,6-di-t-butylphenol).

EXAMPLE 2

Sodium methoxide (11.8 g., 0.218 mole) was suspended in 200 ml. dry dimethylformamide. A solution of 2,6-di-t-butylphenol (41.2 g., 0.200 mole) in 100 ml. dimethylformamide was added, and the clear green-colored solution was stirred for one hour. Then allyl bromide (25 g., 0.21 mole) was added during a 15-minute period with vigorous stirring. Heat was evolved, and the temperature rose to 56° C. The reaction mixture was allowed to cool slowly to room temperature where it remained overnight. It was then poured into one liter of ether to precipitate sodium bromide, filtered, washed with ether, and dried. The sodium bromide weighed 20.35 g. (95.5% of theory). The filtrate was washed with water to remove dimethylformamide and dried over sodium sulfate. Evaporation of the ether left a residue whose major constituent (about 75%) was shown by NMR analysis to be the desired product. During distillation fractions were collected at 90–100° C./0.2 mm. (2.5 g.), 100–103° C./0.2 mm. (11.1 g.), and 103° C./0.2 mm. (27.5 g.). The residue weighed 2.1 g. The fraction collected at 103° C./0.2 mm. was pure 4-allyl-2,6-di-t-butylphenol (56% yield).

EXAMPLE 3

The sodium salt of 2,6-di-t-butylphenol was prepared by in vacuo evaporation to dryness of a solution of 9.32 g. (0.0452 mole) of the phenol and 2.70 g. (0.0500 mole) of sodium methoxide in 50 ml. of reagent grade methanol. The residue was quickly dissolved in 50 ml. of anhydrous dimethylformamide under nitrogen, and the solution was stirred while 7.45 g. (0.0500 mole) of 1-bromo-3-methyl-but-2-ene was added over a 10-minute period. During the addition the temperature rose to 51° C., and a white solid (presumably sodium bromide) appeared. After stirring overnight at ambient temperature under nitrogen, the mixture was warmed at 91–97° C. for one hour, cooled, and diluted with 250 ml. of water. The solution was then extracted with four 100 ml. portions of ether; these were combined, washed in succession with three 100 ml. portions of 10% hydrochloric acid and three 75 ml. portions of 3 N sodium carbonate, dried with Drierite, and evaporated to give a residue (11.37 g.) which was shown by NMR analysis to contain a considerable amount of p-allylated phenol (a mixture of isomers). Fractionation at reduced pressure failed to give satisfactory separation; however, the material with B.P. 164° C./10 mm. proved to be essentially pure 2,6-di-t-butyl-4-(3-methyl-2-buten-1-yl)phenol (1.14 g., 9% yield). Analysis of the lower-boiling fractions (B.P. 115–152° C./10 mm.) by NMR showed that they also contained considerable amounts of this product. Redistillation of the material boiling at 164° C./10 mm. gave a pure sample whose structure was rigorously proven by elemental analysis and by NMR, mass, and infrared spectral measurements.

EXAMPLE 4

A solution of 2,6-di-t-butylphenol (41.2 g.; 0.2 mole) in 100 ml. dry dimethylformamide was added to a stirred solution of sodium methoxide (11.8 g.; 0.22 mole) in 200 ml. dry dimethylformamide in a nitrogen atmosphere. After stirring one hour to allow formation of the sodium salt of the phenol, freshly distilled 1-chloro-5,5,7,7-tetramethyl-2-octene (42.4 g.; 0.21 mole) was added.

After stirring 3 hours at room temperature, there was no evidence of reaction. The mixture was then heated at 60° C. for 9 hours. The green colored suspension was diluted with 2 volumes of ether. The suspension was then washed with water to remove sodium chloride and the dimethylformamide. The ether phase was washed successively with 2% hydrochloric acid and water. After drying the ether extract over anhydrous magnesium sulfate, evaporation of the solvent left 67.8 g. of a light yellow-colored oil.

G.C. separation yielded several small fractions and one major fraction. The major fraction represented 53.8% of the total. The nuclear magnetic resonance spectrum showed that it was 2,6-di-t-butyl-4-(5,5,7,7-tetramethyl-2-octenyl)phenol. Therefore, the yield was 36.4 g., (47.7%).

EXAMPLE 5

The allyl phenol, 2,6-di-t-butyl-4-(5,5,7,7-tetramethyl-2-octenyl)phenol (DBDDP) produced in accordance with Example 4 was added to solid polypropylene and the mixture tested to determine the effectiveness of DBDDP as an antioxidant. Pelletized polypropylene containing DBDDP was subjected to contact with an oxygen-containing atmosphere at 100° C. until failure (occurrence of noticeable degradation) along with speciments containing commercially available inhibitors in identical amounts. The results of these operations are shown in Table I.

TABLE I

| Compound [1]: | Days to failure at 100° C. |
|---|---|
| DBDDP | 55 |
| Ionol (average) | 8 |
| Polygard (average) | 8 |

[1] 0.1 wt. percent in polypropylene.

Ionol is 2,6-t-butyl-p-cresol.

Polygard is a triaryl phosphite used commercially as an antioxidant.

The date in Table I demonstrate that DBDDP is superior to both Ionol and Polygard as an inhibitor for polyolefins against oxidative attack. Hence, the present invention is quite useful and has unobvious properties in that unexpected superior results are obtained.

When used as an oxidation inhibitor, particularly in solid polyolefins such as polypropylene and the like, the allyl phenol may be used in amounts from about 0.01 to about 1.0% by weight based on the polyolefin.

While the invention has been described and illustrated by batch and bench scale reactions, it is to be understood that the invention may be conducted in a continuous operation.

The nature and objects of the present invention having been fully described and illustrated and the best mode contemplated set forth, what we wish to claim as new and useful and secure by Letters Patent is:

1. Allyl phenol having a structure represented by the formula:

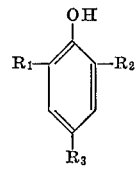

where $R_1$ and $R_2$ are t-butyl substituents and $R_3$ is a primary allyl group having 3 to 12 carbon atoms.

2.

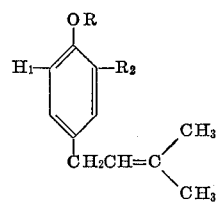

where $R_1$ and $R_2$ are t-butyl.

3.

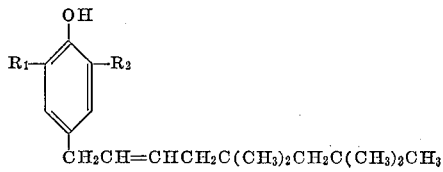

where $R_1$ and $R_2$ are t-butyl.

4. A method of producing allyl phenol which consists of:

contacting an alkali metal salt of a 2,6-disubstituted phenol selected from the group consisting of 2,6-di-t-butylphenol, 2,6-di-t-pentylphenol, 2,6-di-t-octylphenol, and 2,6-dicyclohexylphenol with a primary allyl halide selected from the group consisting of allyl bromide, allyl iodide, allyl chloride, 1-bromo-3-methyl-but-2-ene, and 1-chloro-5,5,7,7-tetramethyl-oct-2-ene in a molar ratio from about 1:1 to about 1:20 in an organic solvent selected from the group consisting of benzene, ethylbenzene, toluene, xylene, dimethylformamide, dimethylacetamide, N-methyl pyrrolidone, and hexamethylphosphoramide, the molar ratio of solvent to alkali metal salt being about 1:1 to about 20:1 at a temperature within the range from about 25° to about 300° C. to form a product containing the corresponding 2,6-disubstituted p-allyl phenol in which the allyl moiety is attached to the phenol ring by an unsubstituted allylic methylene group, which product is substantially free of allylaryl ether; and recovering said allylated phenol from the product.

5. A method in accordance with claim 4 in which the solvent is dimethylformamide.

6. A method in accordance with claim 4 in which the t-alkyl phenol is 2,6-di-t-butylphenol.

7. A method in accordance with claim 4 in which the allyl halide is allyl bromide.

8. A method in accordance with claim 4 in which the allyl halide is 1-bromo-3-methyl-but-2-ene.

9. A method in accordance with claim 4 in which the allyl halide is 1-chloro-5,5,7,7-tetramethyl-oct-2-ene.

10. A method is accordance with claim 4 in which:
(a) the disubstituted phenol is 2,6-di-t-butylphenol; and
(b) the solvent is dimethylformamide.

11. A method in accordance with claim 10 in which the allyl halide is an allyl bromide.

12. A method in accordance with claim 10 in which the allyl halide is an allyl chloride.

13. A method in accordance with claim 4 in which the solvent is benzene.

References Cited

UNITED STATES PATENTS

| | | | |
|---|---|---|---|
| 2,681,371 | 6/1954 | Gaydash | 260—624 |
| 2,968,679 | 6/1961 | Aelony | 260—624 |
| 3,198,842 | 8/1965 | Berrigan | 260—624 |

OTHER REFERENCES

Barner et al.: "Chem.-Abs." 55 (1961), pp. 2540–41.
Kotlyarevskii et al.: "Chem. Abs." 54 (1960), p. 6607.

BERNARD HELFIN, Primary Examiner

W. B. LOWE, Assistant Examiner

U.S. Cl. X.R.

44—77; 252—404; 260—45.7, 93.7, 94.9, 398, 896